United States Patent [19]

Butcher

[11] Patent Number: 4,698,013

[45] Date of Patent: Oct. 6, 1987

[54] MECHANISM FOR VALVE GATED INJECTION MOLDING WITH RESILIENT RETAINING RING

[76] Inventor: Robert M. Butcher, Rte. 1, Box 342-B, Fletcher, N.C. 28732

[21] Appl. No.: 920,779

[22] Filed: Oct. 20, 1986

[51] Int. Cl.4 .................. B29C 45/20; B29C 45/22
[52] U.S. Cl. .................. 425/549; 264/328.8; 264/328.15; 425/562; 425/563; 425/564; 425/566; 425/588
[58] Field of Search .......... 425/549, 562, 563, 564, 425/566, 568, 569, 570, 571, 572, 588; 264/328.1, 328.8, 328.9, 328.14, 328.15

[56] References Cited

U.S. PATENT DOCUMENTS

| | | | |
|---|---|---|---|
| 4,213,751 | 7/1980 | Fernandez | 425/566 |
| 4,446,360 | 5/1984 | Gellert | 219/421 |
| 4,468,191 | 8/1984 | Gellert | 425/564 |
| 4,609,138 | 9/1986 | Harrison | 228/161 |

FOREIGN PATENT DOCUMENTS 1174020 9/1984 Canada .
3336258 4/1986 Fed. Rep. of Germany .

Primary Examiner—Jay H. Woo
Assistant Examiner—Timothy W. Heitbrink
Attorney, Agent, or Firm—Riches, McKenzie & Herbert

[57] ABSTRACT

This invention relates to hydraulic actuating mechanism for a valve gated injection molding system wherein the enlarged head of the valve pin is removably connected to the piston and a floating seal is provided against the leakage of hydraulic fluid. The actuating mechanism has a piston which is reciprocated in a cylinder between open and closed positions. The valve pin extends through a bore in the piston and has an enlarged head which is retained in a cup in the piston by a circular cap which fits over it. The cap is held in position between a removable resilient retaining ring which snaps into a groove and a compressible O-ring. Thus, both a seal against leakage and an easily releasable connection between the valve pin and the piston are provided by the combination of the resilient retaining ring and the O-ring.

6 Claims, 5 Drawing Figures

MECHANISM FOR VALVE GATED INJECTION MOLDING WITH RESILIENT RETAINING RING

BACKGROUND OF THE INVENTION

This invention relates to valve gated injection molding and more particularly to improved valve pin actuating mechanism wherein a resilient O-ring and a compressible retaining ring are used to removably connect the valve pin to the piston.

In a hydraulically actuated valve gated injection molding system, it is necessary that the valve pin be securely connected to the piston, but it is also desirable that it be easily removable. It is also necessary that the connection not cause or permit the leakage of pressurized hydraulic fluid from the cylinder.

In the past, a variety of arrangements have been used to connect the valve pin to the piston. One of these is shown in U.S. Pat. No. 4,468,191 to Gellert entitled "Hydraulically Actuated Injection Molding with Alternate Hydraulic Connections" which issued Aug. 28, 1984. This patent shows the valve pin extending through the piston and having an enlarged head which is seated in the piston and held in place by a threaded cap or plug. While this arrangement is satisfactory for many applications, it has the disadvantages that the threads do not always provide a secure seal against leakage between them and also the threaded cap must be relatively thick which is a problem in application where minimum mold height is desirable.

German patent number DE No. 3,336,258C2 dated Apr. 17, 1986 to Hasko Normalien Hasenclever & Co shows a valve pin which is held in place by a resilient retaining ring. However, there is not adequate provision against leakage of pressurize hydraulic fluid past the valve pin.

SUMMARY OF THE INVENTION

Accordingly, it is an object of the invention to at least partially overcome the disadvantages of the prior art by providing a system wherein the enlarged head of the valve pin is removably connected to the piston and a seal is provided against the leakage of hydraulic fluid.

To this end, in one of its aspects, the invention provides a valve gated injection molding system having at least one heated nozzle seated in a cavity plate, the nozzle having a central bore in alignment with a gate leading to a cavity, an elongated valve pin having an enlarged driven end and a tip end, the valve pin extending through the central bore of the nozzle with the driven end being operatively connected to hydraulic valve pin actuating mechanism mounted on a mold back plate whereby the valve pin is reciprocated beween a retracted open position and a closed position wherein the tip end of the valve pin is seated in the gate, and a melt passage extending to convey melt around the valve pin through the central of the nozzle to the gate, having the improvement wherein, the valve pin actuating mechanism comprises a piston with a body and a cap seated in a cylinder with hydraulic fluid lines connected to apply hydraulic pressure to opposite sides of the piston to reciprocate the piston according to a predetermined cycle, the driven end of the valve pin having an enlarged head, the body of the piston having a well with an inner wall and an open mouth to receive the cap therein, the well having a shoulder at the bottom thereof forming a cup leading to a central bore extending through the body of the piston to receive the valve pin therethrough with the head of the valve pin seated in the cup, the inner wall of the well having a groove to receive an inwardly compressible resilient retaining ring which expands into the groove to removably retain the cap between the retaining ring and circumferential sealing means compressed between the shoulder and the cap, whereby the cap retains the head of the valve pin in the cup to removably connect the driven end of the valve into the piston and the compressible sealing means seals against leakage of hydraulic fluid.

Further objects and advantages of the invention will appear from the following description taken together with the accompanying drawings.

DETAILED DESCRIPTION OF THE DRAWINGS

Figure 1:
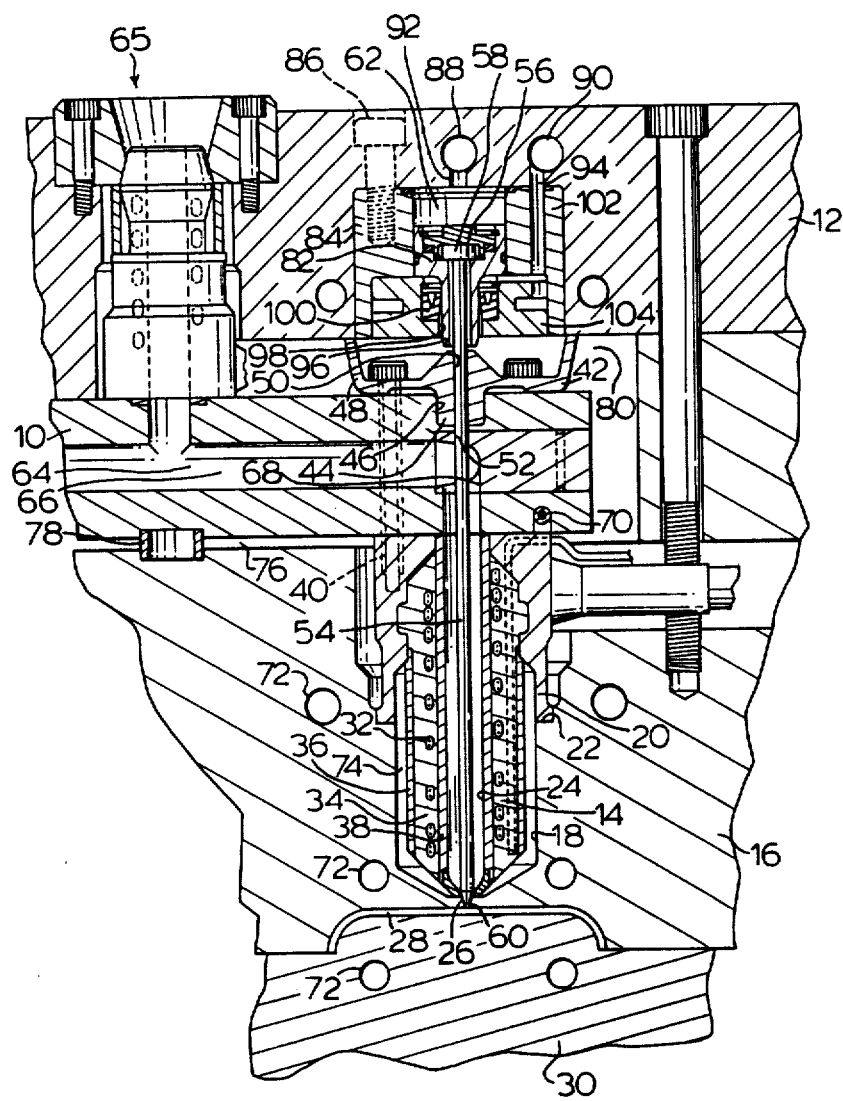
FIG. 1 is a sectional view of a portion of a multi-cavity valve gated injection molding system showing hydraulic actuating mechanism according to a preferred embodiment of the invention.
Figure 2:
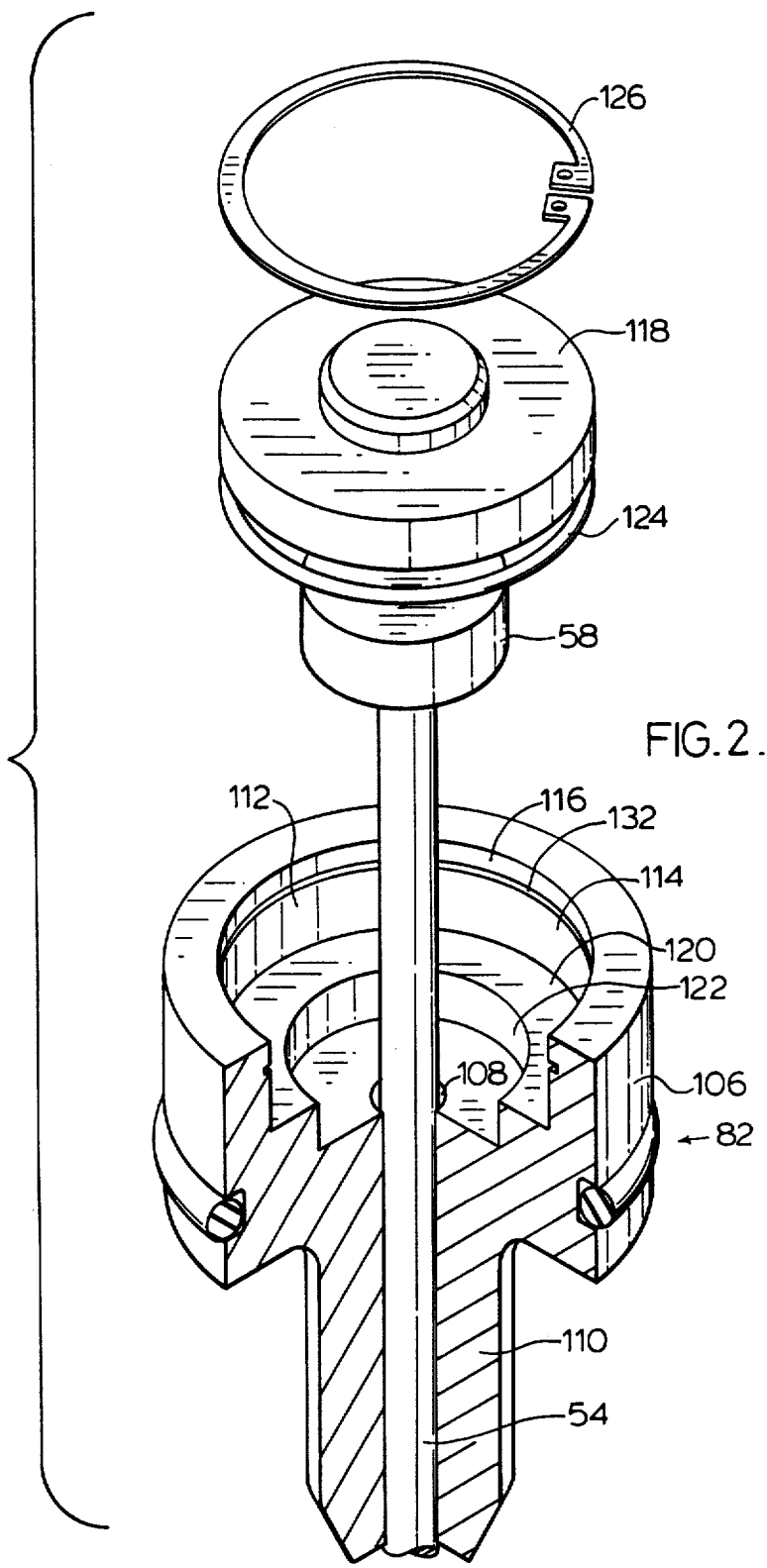
FIG. 2 is an exploded isometric view showing the piston, valve pin, cap and retaining ring seen in FIG. 1.

Reference is first made to FIG. 1 which shows part of a multi-cavity injection molding system in which a manifold 10 extends between a mold back plate 12 and a number of heated nozzles 14 seated in a cavity plate 16. Each nozzle 14 is located in a well 18 in the cavity plate 16 by a locating bushing portion 20 which seats on a shoulder 22 in the well. Each nozzle 14 has a central bore 24 in alignment with a gate 26 which leads to a cavity 28 between the cavity plate 16 and a movable mold platen 30. In this embodiment, the heated nozzles 14 have a helical electrical heating element 32 cast in a beryllium copper portion 34 between a stainless steel outer portion 36 and a stainless steel inner portion which forms the central bore 24. Manufacture of these nozzles 14 is described in more detail in U.S. Pat. No. 4,446,360 to Gellert entitled "Sprue Bushing Connector Assembly" which issued May 1, 1984.

Each nozzle 14 is fixed to the manifold 10 by bolts 40 which also secure a sealing and retaining bushing 42 to the other side of the manifold as described in more detail in the applicant's Canadian patent application Ser. No. 520,519 entitled "Sealing and Retaining Bushing for Injectio,n Molding" filed Oct. 17, 1986. The sealing and retaining bushing 42 has a collar portion 44 which is seated in a well 46 in the manifold and an outer flanged portion 48 which contacts the mold back plate 12 during operation. The bushing 42 is located with its central bore 50 in alignment with a transverse bore 52 through the manifold and with the central bore 24 of the nozzle. An elongated valve pin 54 having a driven end 56 with an enlarged head 58 and a tapered tip end 60 extends through the aligned central bore 50 of the bushing, the transverse bore 52 through the manifold 10, and the central bore 24 of the nozzle 14. The driven end 56 of the valve pin 54 is connected to hydraulic actuating mechanism 62 seated in the back plate 12 which is described in more detail below. The actuating mechanism reciprocates the valve pin 54 between a retracted open position and a closed position in which the tip end 60 is seated in the gate 26.

A melt passage 64 extends through a heated sprue bushing 65 which receives pressurized melt from a molding machine (not shown) to the manifold 10 where it branches out through longitudinal bores 66. The sprue bushing 65 in this embodiment is made by the method described in Gellert's Canadian patent application Ser. No. 496,645 entitled "Manufacturing Method for Selected Gate Configuration Injection Molding Nozzles" filed Dec. 2, 1985. Each longitudinal bore 66 connects to an enlarged portion 68 of the transverse bore 52 through the manifold. The melt passage 64 extends through the enlarged portion 68 of the transverse bore 52 and through the central bore 24 through the nozzle around the valve pin 54 to the gate 26. A machined plug 68 is brazed into the manifold 10 to provide a smooth joint between them as described in the applicant's U.S. Pat. No. 4,609,138 entitled "Method of Manufacturing Injection Molding Manifold with Plugs" which issued Sept. 2, 1986.

As is well known, it is critical to succesful operation of the system that the hot melt be maintained within a certain temperature range as it flows along the melt passage 64 to the gate 26. Thus, each nozzle 14 is heated by the electrical heating element 32, and the manifold 10 is heated by an electrical heating element 70 which is cast into it as described in Gellert's Canadian patent No. 1,174,020 entitled "Injection Molding Manifold Member and Method of Manufacture" which issued Sept. 11, 1984. As is also well known, it is necessary to separate these heated components of the system from the adjacent mold back plate 12 and cavity plate 16 which are cooled by water flowing through cooling channels 72. Thus, an insulative air space 74 is provided between each nozzle 14 and the surrounding cavity plate 16 by the locating bushing portion 20 seating on shoulder 22. Similarly, another insulative air space 76 is provided between the hot manifold 10 and the cooled cavity plate 16 by a central locating ring 78 and the height of the nozzles 14 to which the manifold 10 is secured. A further insulative air space 80 is provided between the hot manifold 10 and the cooled back plate 12 by sealing and support bushings 42. In addition to retaining the manifold 10 and the nozzles 14 in place, the bushings 42 also seal against the leakage of melt around the reciprocating valve pins 54 and form containment chambers to trap any melt which does leak.

The hydraulic actuating mechanism 62 includes a piston 82 which reciprocates in a cylinder 84 to drive the valve pin 54. The cylinder 84 is seated in the mold back plate 12 and secured in position by bolts 86. Hydraulic fluid lines 88,90 extend through the mold back plate 12 and are connected by ducts 92,94 to the cylinder 84 on opposite sides of the piston 82. Controlled fluid pressure is applied to reciprocate the piston and valve pin according to a predetermined cycle in a conventional manner. The piston 82 has an elongated neck portion 96 which protrudes out an opening 98 in the cylinder, and a V-shaped high pressure seal 100 extends around the neck portion to prevent leakage of pressurized hydraulic fluid around it. In this particular embodiment, the flow of hydraulic fluid also provides cooling to the piston 82 and particularly to the area around the V-shaped seal 100. To provide this configuration, the cylinder 84 is made with an outer portion 102 and an inner portion 104 in which the V-shaped seal 100 is seated. The outer and inner portions 102,104 are brazed together into an integral cylinder 84 with the desired fluid flow configuration as described in the applicant's Canadian patent application Ser. No. 520,804 entitled "Fluid Cooled Hydraulic Actuating Mechanism for Injection Molding" filed Oct. 17, 1986.

Figure 3:
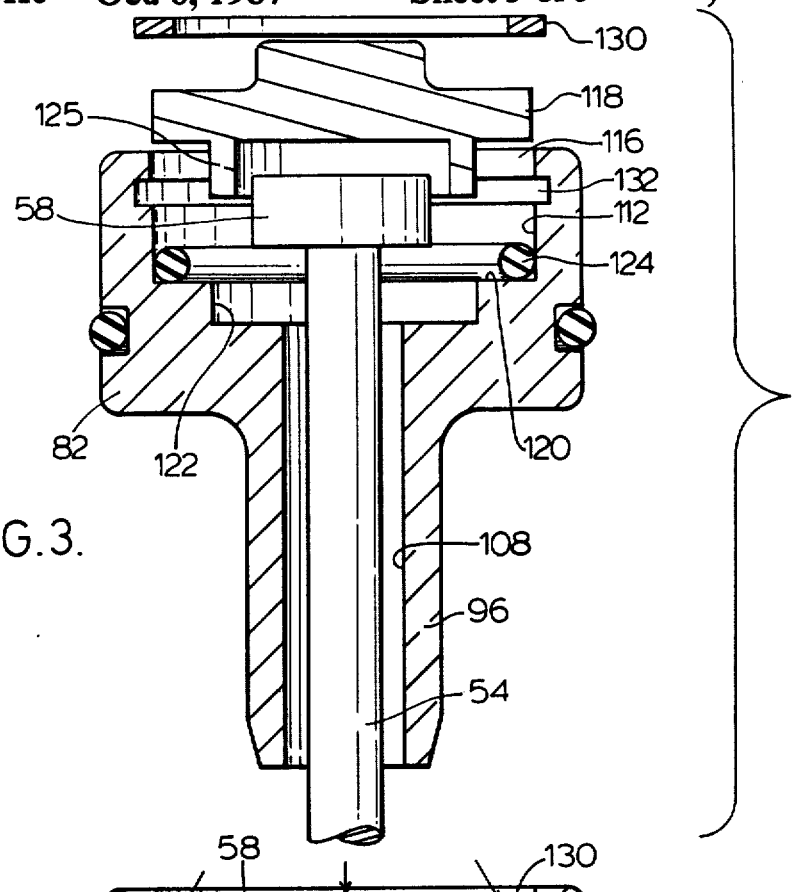
FIGS. 3–5 are a series of sectional views showing assembly of the cap and retaining ring in the piston.
Figure 4:
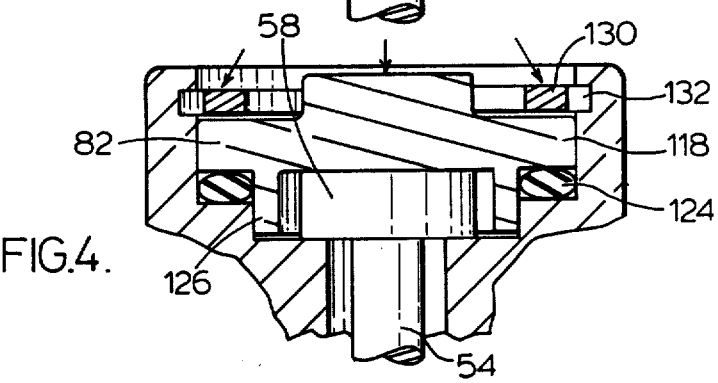
Figure 5:
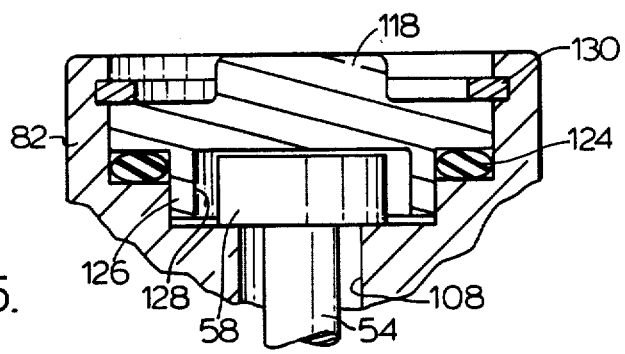

The present invention relates to an improved mechanism for connecting the valve pin 54 to the piston 82, as more clearly shown in FIGS. 2-5. The piston 82 has a main body 106 with a central bore 108 extending through it and the neck portion 110 to receive the valve pin 54 therethrough. The body 106 of the piston has a well 112 with an inner wall 114 and a mouth 116 to receive a circular cap 118 therethrough. The well 112 has a shoulder 120 at its bottom which forms a smaller diameter cup 122 leading to the central bore 108. As shown in FIGS. 3-5, a circular O-ring 124 is placed on the shoulder 120 and the cap 118 is lowered into the mouth 116 of the well 112 to a position in which the enlarged head 58 of the valve pin 54 is received in the cup 122 in the piston body 106. The cap 118 is then forced downwardly to compress the O-ring 124 between the cap 118, the shoulder 120 and a downwardly projecting flanged portion 126 of the cap 118. An inwardly compressible resilient retaining ring 130 is then snapped into a groove 132 in the inner wall 114 of the well 112 to secure the cap 118 in place. As can be seen in the assembled position, the cap 118 retains the head 58 of the valve pin 54 securely in a recess 128 formed by the flanged portion 126 inside the cup 122 to connect the driven end of the valve pin 54 to the piston 82. However, it can quickly and easily be disconnected by removing the resilient retaining ring 130 from the groove 132. In addition to removably connecting the valve pin 54 to the piston 82, the combination of the retaining ring 130 and the compressed O-ring 124 also provide a seal against the leakage of hydraulic fluid past the cap 118.

As clearly seen in FIG. 5, the recess 128 is larger in diameter than the head 58 of the valve pin 54, and the central bore 108 through the piston is larger in diameter than the valve pin 54 extending through it. This provides for lateral movement between the valve pin and the piston as a result of thermal expansion of the manifold in applications such as this where the valve pin is laterally secured relative to the manifold.

In use, the system is assembled with the valve pins connected to their respective pistons as described above. The bushings 42 are bolted through the manifold 10 to the nozzles 14. This applies an initial preload so that melt does not escape between them initially. The height of the flanged portions 48 of the cold bushings 42 is slightly less than the width of the desired air space 80 to allow for heat expansion. Similarly, as described above, there is provision for slight lateral movement of the valve pin 54 in the piston 82 to allow for lateral thermal expansion of the manifold 10 from the central locating ring 78. Electrical power is applied to the sprue bushing 68 and the heating elements 32,70 of the nozzles 14 and the manifold 10 to heat them to predetermined temperatures. The sealing and support bushings 42 expand into bearing contact with the mold back plate 12 to apply a further load to securely tighten the manifold 10 and the nozzles 14 into position and maintain the desired air gaps 74,76,80. Hot pressurized melt is then introduced into the sprue bushing 65 from a molding machine (not shown) and flows through the melt passage 66. Controlled hydraulic fluid pressure is applied to the fluid lines 88,90 and ducts 92,94 to control simultaneous actuation of the valve pins 54 according to a predetermined cycle in a conventional manner. With the valve pins 54 in the retracted open position, the melt flows through the melt passages 64 to the gates 26 and into the cavities 28. When the cavities 28 are full, the pressure is held momentarily to pack. The hydraulic pressure is then applied to reciprocate the valve pins 54 to the closed position with each tip end 60 seated in one of the gates 26. The injection pressure is then reduced and the position held for a short cooling period before the mold opens for ejection. After the mold is closed again the hydraulic pressure is applied to withdraw the valve pins to the open position and the melt injection pressure is reapplied to refill the cavities. This cycle is repeated continuously every few seconds depending upon the size and shape of the cavities and the type of material being molded.

Engaging the cap 118 between the retaining ring 130 and the resilient O-ring 24 allows the valve pin 54 to be easily removed if this becomes necessary. At the same time, it provides a good floating seal against the leakage of pressure hydraulic fluid from the cylinder. Both of these factors are important to the satisfactory operation and maintenance of the system.

While the description of the actuating mechanism and the injection molding system have been given with respect to a preferred embodiment, it is not to be construed in a limiting sense. Variations and modifications will occur to those skilled in the art. For instance, it is apparent that the resilient O-ring and the retaining ring can have alternate configurations from that shown. Similarly, the injection molding system can have various manifold configurations and different heated nozzles can be used. Reference is made to the appended claims for a definition of the invention.

What I claim is:

1. In a valve gated injection molding system having at least one heated nozzle seated in a cavity plate, the nozzle having a central bore in alignment with a gate leading to a cavity, an elongated valve pin having an enlarged driven end and a tip end, the valve pin extending through the central bore of the nozzle with the driven end being operatively connected to a hydraullic valve pin actuating mechanism mounted on a mold back plate whereby the valve pin is reciprocated between a retracted open position and a closed position wherein the tip end of the valve pin is seated in the gate, and a melt passage extends to convey melt around the valve pin through the central bore of the nozzle to the gate, the improvement wherein;

the valve pin actuating mechanism comprises a piston with a body and a cap, said piston seated in a cylinder with hydraulic fluid lines connected to apply hydraulic pressure to opposite sides of the piston to reciprocate the piston according to a predetermined cycle, the driven end of the valve pin having an enlarged head, the body of the piston having a well with an inner wall and an open mouth to receive the cap therein, the well having a shoulder at the bottom thereof forming a cup leading to a central bore extending through the body of the piston to receive the valve pin therethrough with the head of the valve pin seated in the cup, the inner wall of the well having a groove to receive an inwardly compressible resilient retaining ring which expands into the groove to removably retain the cap between the retaining ring and a compressible circumferential sealing means compressed between the shoulder and the cap, whereby the cap retains the head of the valve pin in the cup to removably connect the driven end of the valve pin to the piston and the compressible sealing means seals against leakage of hydraulic fluid.

2. An injection molding system as claimed in claim 1 wherein the system comprises a number of heated nozzles and includes a manifold which extends between each nozzle and the mold back plate, the manifold having a number of transverse bores therethrough each of which is in alignment with the central bore of one of the nozzles and the central bore of the respective piston, the melt passage branching in the manifold to convey melt to the central bore of each of the nozzles.

3. An injection molding system as claimed in claim 2 wherein each piston has a neck portion which protrudes out an opening through the cylinder, the central bore of the piston extending through the neck portion to receive the valve pin therethrough.

4. An injection molding system as claimed in claim 3 wherein a high pressure seal seated in the opening through each cylinder extends around the neck portion of each piston to seal against the leakage of hydraulic fluid between the cylinder and the neck portion of the piston.

5. An injection molding system as claimed in claim 4 wherein the sealing means between the shoulder and the cap of each piston is a resilient O-ring.

6. An injection molding system as claimed in claim 5 wherein each heated nozzle is fixed to the manifold with the central bore of the nozzle in alignment with one of the transverse bores through the manifold, and the central bore extending through each piston and the cup are sufficiently larger in diameter respectively than the valve pin and the valve pin head to allow lateral movement between them as a result of thermal expansion of the manifold.

* * * * *

UNITED STATES PATENT AND TRADEMARK OFFICE
CERTIFICATE OF CORRECTION

PATENT NO. : 4,698,013
DATED : October 6, 1987
INVENTOR(S) : Robert M. Butcher

It is certified that error appears in the above-identified patent and that said Letters Patent is hereby corrected as shown below:

On the title page Insert

--(73) Assignee: Mold-Masters Limited --.

Signed and Sealed this

Fifth Day of July, 1988

Attest:

DONALD J. QUIGG

Attesting Officer

Commissioner of Patents and Trademarks